United States Patent [19]

Hartley et al.

[11] Patent Number: 4,868,863

[45] Date of Patent: Sep. 19, 1989

[54] APPARATUS FOR CONNECTING DATA PROCESSING EQUIPMENT TO A COMMUNICATION NETWORK

[75] Inventors: John D. Hartley; Mark Germain, both of Hampshire; Brian D. Key, Hants; Ray Jepson, Hants; Victor G. Golding, Hants; Steven Cook, Hants; Paul D. Maddison, Hants, all of United Kingdom

[73] Assignee: IBM Corporation, Armonk, N.Y.

[21] Appl. No.: 251,157

[22] Filed: Sep. 29, 1988

[30] Foreign Application Priority Data

Sep. 30, 1987 [EP] European Pat. Off. ........ 87308679.7

[51] Int. Cl.4 .......................................... H04M 11/06
[52] U.S. Cl. ...................................... 379/98; 379/93; 379/441
[58] Field of Search ...................... 379/90, 91, 93–98, 379/441–443

[56] References Cited

U.S. PATENT DOCUMENTS 4,688,170  8/1987  Waite et al. ............................ 379/98
4,788,717 11/1988  Blanchard et al. .................... 379/93

FOREIGN PATENT DOCUMENTS 0142302  5/1985  European Pat. Off. .
0169548  1/1986  European Pat. Off. .
3322690  1/1985  Fed. Rep. of Germany ........ 379/93
0269546 11/1986  Japan .
8703764  6/1987  World Int. Prop. O. ............ 379/98

Primary Examiner—Jin F. Ng
Assistant Examiner—Wing F. Chan
Attorney, Agent, or Firm—Edward H. Duffield

[57] ABSTRACT

Apparatus for connecting data processing equipment to a communications network includes hardware for a range of different communications standards. Also included is a coupler (preferably in the form of a cable) having a particular standard communications plug which contains an identifying code associated with that particular standard plug, which code is used to configure the apparatus to that particular standard. The apparatus contains a digital signal processor controlled by control code contained in a control store having associated therewith a standard identifier code. Control logic reads the standard identifier code associated with the control code and the standard identifying code in the coupler and enables the apparatus if the two match (or disables if they do not match). The control store can either contain only the code associated with a particular standard or it can contain all the code for a range of standards: in the latter case the control logic would allow the signal processor to access only the sections of the control store containing the relevant control code. The invention is particularly useful for connecting data processing equipment through a modem to different country telephone networks.

11 Claims, 4 Drawing Sheets

APPARATUS FOR CONNECTING DATA PROCESSING EQUIPMENT TO A COMMUNICATION NETWORK

FIELD OF INVENTION

This invention relates to apparatus for connecting data processing equipment, such as personal computers, word processors or other workstations, to a communications network to communicate with other data processing equipment. National communications networks have different "national" requirements (hereinafter referred to as standards) standards from one another, whether they be digital networks or analogue networks, the most common of which is the telephone system. The telephone system exemplifies how standards vary from country to country.

PRIOR ART

When data processing equipment is connected to an analogue network such as the telephone system, use is made of a modem. The purpose of the modem (modulator/demodulator) is to convert the digital data stream within the data processing equipment into a form which is suitable for transmission over a telephone network, and vice versa.

U.S. Pat. No. 4,431,867 describes a typical modern modem in which the various functions of the modem are operated under the control of a digital microprocessor with a read only memory containing control code. There are two basic modes of operation, command mode in which the modem will respond to commands prior to and after transmitting or receiving data, and data mode in which the modem will perform basic modulation and demodulation functions. In common with most other modems, it provides a connection between a standard telephone network and a standard data port.

The problem is that there is no "single" standard telephone line, each telephone network in each country having its own standard. Each country also has some kind of approvals procedure and regulations which make it illegal to connect unapproved equipment to the telephone network of that country. There are thus two problems which need to be overcome in equipment that needs to be connected to a telephone line. Firstly the equipment must be able to respond to the signals which are received over a particular network and to issue signals which are compatible with that network. Secondly, the equipment must be approved (in a so-called homologation process) by the appropriate body so that it can be legally connected to the public telephone network. Within this specification, the approval body will be referred to as the PTT (from Postal Telephone & Telegraph) authority. Equipment will not normally be approved by a PTT if it is capable of issuing "incorrect" signals and to this extent the equipment should be "tamper proof", that is it should not be possible for some unauthorised person to tamper with the equipment so that it no longer conforms to the particular network standards.

These problems have ensured that modems of the type described in U.S. Pat. No. 4,431,867 are manufactured in various versions, each country version having a different read only store and network components so that the modem can only operate in accordance with the standards of that particular country. Clearly there could be a significant benefit if a modem could be produced which can be used in a large number of countries. Not only could this give rise to economies of scale in manufacturing and give better inventory control (fewer part numbers), but it could also lead to greater portability of equipment across national borders.

It has already been proposed to use a common "universal" modem and to configure this to a particular national network by means of jumpers or switches. However these have not enjoyed wide-spread success, possibly due to their high cost and the elaborate and expensive mechanisms used to make them "tamper proof". Also, many do not allow pulse dialling or shorting of the transformer during dialling and hence the question or whether they are "universal" is very dubious since they will not meet many of today's country requirements. Protective devices/couplers and safety isolation barriers have also been used in the past to protect the telephone network from non-standard signals which might be transmitted by the equipment to which it is connected.

Apart from the different telephone systems, there are also digital communications networks, some private and some public. These too have differing standards. In the broadest aspect, the present invention is applicable to these digital networks although the preferred embodiments will be described in terms of telephone systems.

OBJECTS OF INVENTION

An object of the present invention is to provide improved apparatus which is suitable to connect data processing equipment to a plurality of different communications networks and which is automatically configured to the appropriate standard when connected to a network coupler.

BRIEF SUMMARY

According to one aspect of the invention, apparatus for connecting data processing equipment to a communication network includes circuits for transmitting and/or receiving signals between the data processing equipment and the communications network and a digital signal processing means for controlling the operation of said transmitting/receiving circuits in accordance with control code stored in a control store, and means for coupling the equipment to the network, and is characterised in that said apparatus includes common hardware for a range of different network standards, in that said coupling means contains an identifier for identifying which network is to be connected to the equipment, and in that said apparatus is configured to the standard of a particular network when the coupling means is connected to the apparatus.

According to another aspect of the invention, a coupler for connecting data processing equipment including to a communications network comprises a plug for connecting the coupler to a standard socket within a country and a connector for attaching the coupler to the data processing equipment and is characterized in that the coupler includes a country identifier code for configuring the apparatus to operate in a manner to comply with that particular country standard.

In one embodiment of the invention for connecting the equipment to a telephone line, use is made of a modem constructed so that when it is first connected to a country-specific modem-to-telephone line coupler, a code which is unique to that particular coupler is read into the control code store thereby automatically allocating specific country parameters to configure the modem to a particular telephone network standard: thereafter each time the modem is powered on, a check is made to determine whether the coupler in use is compatible with the stored control code and, if it is not, the modem is inhibited from operation. If it were desired to re-configure a modem to a new standard, it is preferred that this coupled only be done in an authorised manner using a new telephone line coupler since this will ease the problem of homologation of the equipment.

As an alternative, all possible control code for different telephone network standards could be stored in the control code store (which in this event could be a read only memory) but with the access by the digital signal processor to the control code store being controlled by the coupler identifier information.

By using hash sums or equivalent protection techniques, it can be ensured that the contro code cannot be tampered with or modified by unauthorised people.

BRIEF DESCRIPTION OF DRAWINGS

The invention will now be described, by way of example, with reference to the accompanying drawings, in which.

DETAILED DESCRIPTION

Figures 1, 2:
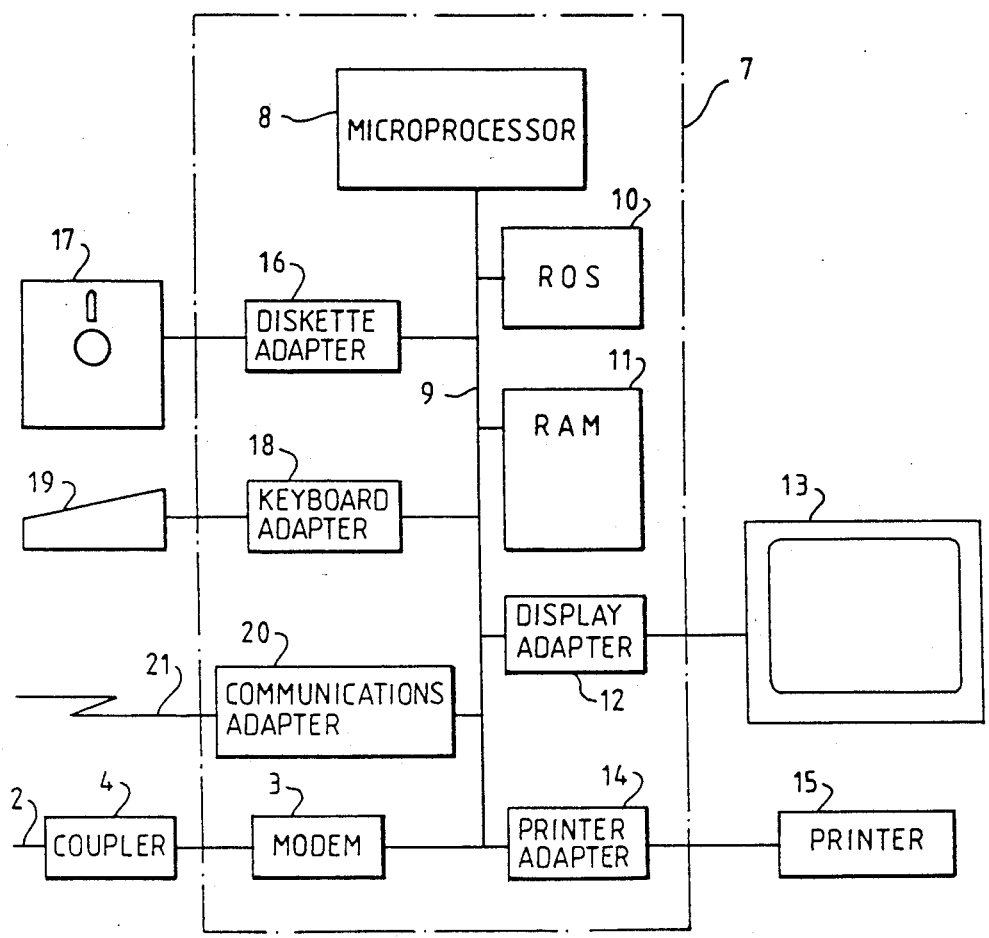
FIG. 1 is a block diagram illustrating the basic principles behind the present invention as applied to a telephone network.
FIG. 2 shows how the invention may be implemented in a personal computer connected to a telephone network.

FIG. 1 serves to illustrate the basic principles underlying the present invention where it is desired to connect data processing equipment 1 to the public telephone network 2. To this end the invention uses a modem 3 which contains all the control and signal processing circuits and hardware which is common to all countries to which it is desired to connect. A modem-to-telephone line coupler 4 connects the modem 3 to the telephone line 2 via plug and socket connections 5 and 6. The coupler 4 contains the hardware (for example resistors, relays) which is unique to a particular country and has the standard telephone plug 6 for that particular country. An important feature of the invention is that the coupler 4 contains an identifier which defines the particular country and which automatically allows the modem 3 to be configured to that particular country's telephone line and CCITT (Comite Consultatif International Telegraphique et Telephonique) standards. As will be seen below, in addition to the two modes of operation mentioned above, that is command mode and data mode, there is a third "primitive" mode in which signals are prevented from transmission onto the telephone network.

FIG. 2 illustrates how the invention may be implemented in a personal computer such as the IBM Personal Computer XT or AT or Personal System/2.

The personal computer includes a system unit 7 containing a microprocessor 8. Connected to the PC bus 9 are a read only store 10 containing control code for operating the microprocessor 8. a random access memory 11 for containing code and/or data for use during operation of the personal computer, a display adapter 12 for displaying data as a display device 13, normally a raster-scanned cathode ray tube display, and a printer adapter 14 to allow the printing of data on an attached printer 15.

Also connected to the system bus 9 are a diskette adpater 16 to allow for additional storage of data and/or code in a diskette on diskette drive 17. Frequently the diskette drive will be integrated within the system unit 7 and serves as a principle non-communication-link mechanism by which data and code can be loaded into and out of the computer. Diskette drive 17 may be replaced or supplemented by a hard disk file, not shown. Keyboard adapter 18 allows keyboards 19 to enter data and/or commands into the computer by the operator and communications adapter 20 allows communication over a data link 21 to a remote data processor. Construction and operations of these various adapters are well known and will not be described except to say that they each provide the correct interface with the external devices and also any necessary buffering or signal processing requirements.

Also included within the system unit 7 is the modem 3 which is connectable to the public telephone network 2 by the coupler 4. Although the modem 3 could be constructed as a plug-in printed circuit card, it could, in fact be integrated into the main planar board of the personal computer's system unit. This would be cheaper than having a separate pluggable card and is possible because the modem 3 is common to a wide range of countries. As will be explained below, it may be desirable for some parts of the modem 3 to be removed therefrom and incorporated into the coupler 4.

Figure 3:
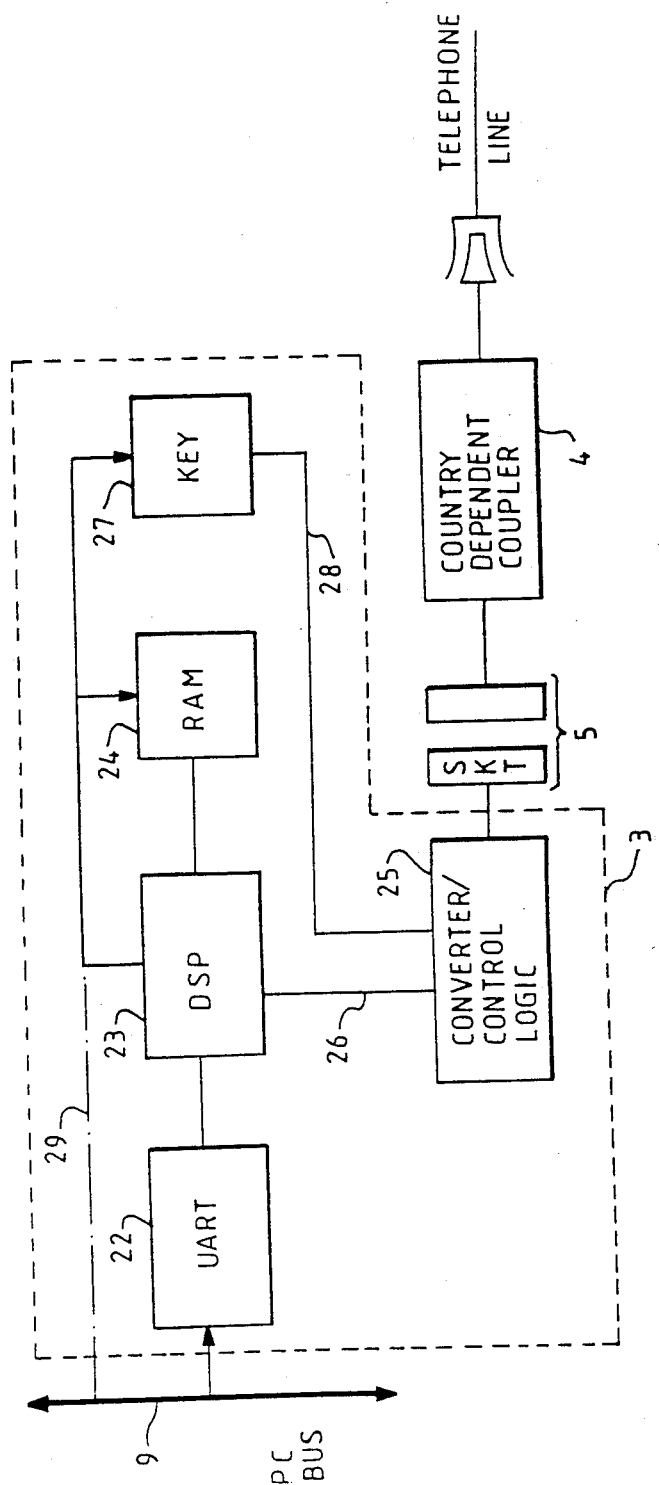
FIG. 3 illustrates a preferred embodiment of the invention in more detail.

FIG. 3 shows the modem 3 in more detail and is a preferred embodiment of the invention. Not shown are the various modulating, demodulating, tone generating and other circuits which are well understood by communications engineers since such details would only serve to make the description and drawings unnecessarily lengthy and complex. The modem 3 contains all the components which are common to a whole range of countries and includes a universal asynchronous receiver/transmitter (UART) device 22 to which is connected a digital signal processor (DSP) device 23 (frequently known as a programmable signal processor) which performs the modulation and demodulation function. The UART and DSP devices 22 and 23 are readily available off-the-shelf semiconductor modules and could, for example, be constituted by the National Semiconductor NS 16450A device for the UART and the Texas Instrument TMS 3290, TMS 320C10, TMS 320C15 devices for the DSP.

The DSP 23 processes signals presented to it by UART 22 in accordance with the control code (which includes country dependent parameters) stored in random access memory 24. Although only one memory 24 is shown, more than one memory could be used. For example a separate readable store containing common code could be provided. In some circumstances, it may be desirable to include an additional microprocessor within the modem to execute control code in accordance with signals from the UART22 to control the operation of the DSP 23 or alternatively to replace the DSP 23. This additional microprocessor would then relieve the mcroprocessor of the personal computer of many of the associated tasks.

In FIG. 3, data (code) to be loaded into memory 24 and a register 27 from the PC bus 9 are routed through UART 22 via DSP 23. In addition of alternatively, data (and/or code) could be loaded directly into memory 24 and register 27 from the PC bus 9 by a connection represented by 29.

In this preferred embodiment, memory 24 contains only the code required for the particular country associated with the particular coupler 4 connected to the modem 3 through socket connection 5. To this end, coupler 4 contains a country identifier which is read by the modem 3 and which is used to load required code into the RAM 24 from the PC system bus 9. The coupler 4 acts as a modem adapter cable and, in combination with the modem 3, provides the correct load impedance to match the requirements of the PTT cable 2: coupler 4 performs no modulation or demodulation function. The modem 3 includes convertor/control logic unit 25 which reads the country identifier in coupler 4 and compares this with the country identifier of the code stored in the memory 24. If there is inequality, the convertor/control logic unit 25 will not enable the modem. If there is equality, the convertor/control logic unit 25 will enable digital signals from the DSP 23 to be converted to analogue signals therein to pass to the coupler 4 via line 26 and socket 5. Country identifier code associated with the code stored in the RAM 24 is stored into key register 27 from which it is accessible to control logic 25 via line 28. This sequence is summarised in FIG. 4. Thus, the converter/control logic unit 25 has two main functions. At power on, it reads the country code identifier from the coupler and in conjunction with the DSP 23 checks this against the stored country code. If the check is valid, the modem will be enabled. When the modem is enabled, analogue signals from the telephone line are converted by the unit 25 into digital signals. These digital signals are sampled by the DSP 23 along line 26 in accordance with the country dependent code stored in RAM 24.

Outgoing signals from the UART 22 are processed by the DSP 23 in accordance with the country dependent control code in RAM 24 and are then passed along line 26 to the converter/control logic unit 25 where they are converted into analogue signals for transmission over the telephone network (but only if the modem has been enabled).

The country parameters stored in RAM 24 (and associated identifier in register 27) can be loaded therein in a number of ways. It is preferred that when the workstation is being installed or set up, a diskette containing the country code is used to load the code via diskette drive 17, FIG. 2, diskette adapter 16, FIG. 2, and PC bus 9 under control of the microprocessor 8, FIG. 2: this diskette could be a "universal" diskette containing all versions of code in which case provision will be required to identify which code needs to be loaded, or each country-specific coupler 4 could be supplied with an associated country-specific diskette which would be used when the coupler 4 is being connected to the modem. This sequence is summarised in FIG. 5.

In an alternative arrangement, the RAM 24 (containing code for a specified country) is replaced by a store (which is preferably a read only store) containing all possibly desired code but the country identifier read by the converter/control logic unit 25 from the coupler 4 is used to enable the DSP 23 to access only those sections of the read only store which contain control code associated with that country.

In this manner, it can be ensured that the modem contains all the common hardware but that this hardware can only be configured in accordance with the country identifier contained within the country-specific coupler 4.

In a further modification, not shown, the identifier read from the coupler 4 by the convertor/control logic unit 25 can be passed to the microprocessor 8, FIG. 2, which would then load the appropriate code into RAM 24/register 27 or enable access by the DSP 23 to predetermined sections of the store 24 where this contained all possibly required code.

In another approach it can be envisaged that a diskette contains the necessary modulation/demodulation code required to meet a country requirement. For example, code such as CCITT V22, V21, V26ter, can be downloaded from the diskette to enable the DSP 23 to operate at the above modulation/demodulation speeds.

Any code contained on a diskette for loading into the modem can be protected against modification or tampering by unauthorised persons, for example by the use of hash sums or equivalent protection techniques.

When the data processing equipment is not connected to a telephone or other communications network, it may be desirable to load non-communication control code into the control store to allow the DSP 23 to control another function: in this mode the control logic would not allow the equipment to be connected to the communications network.

Apart from the technical advantages gained by such an arrangement (lower costs due to economy of scale for hardware manufacture and reduced number of part numbers - one modem instead of one modem for each country the invention also allows easier homologation since each country dependent coupler can only be used in one country and cannot be readily modified.

In a specific example of modem, the socket/plug 5 has 15 pins for carrying signals as specified below in Table 1. The plug to the telephone line will have a number of pins which depends on the country. Modern packaging technology is such that in many cases, any country dependent components in the coupler can be encapsulated in the cable itself (to give a so-called "fat" cable).

| :pin : | Purpose | :Elect. : |
|---|---|---|
|  | screen gnd (connect to shell) |  |
| :1 | Digital gnd. | gnd : |
| :2 | Dial Loop | 5V : |
| :3 | Dial Pulse | 5V : |
| :4 | Off-Hook | 5V : |
| :5 | Ring indicate | TTL : |
| :6 | Switch Hook/Optional | TTL : |
| :7 | Select Country Code | TTL : |
| :8 | +5V | 5V : |
| :9 | Analogue 1 | 0 to : |
| :10 | Analogue 2 | −48dBm: |
| :11 | Country Code 1 | TTL : |
| :12 | Country Code 2 | TTL : |
| :13 | Country Code 3 | TTL : |
| :14 | Country Code 4 | TTL : |
| :15 | Optional | TTL : |

TABLE 1

Definition of the various lines contained in the interface and the function performed when activated is loaded below:

Screen Ground

The earth (chassis) continuity between the two units.

1. Digital gnd.

Connected to the inter-plane ground on the modem card.

2. Dial Loop

Activation of this line causes the dial loop relay in the coupler 4 to operate during the dialling phase to present the correct impedance to the netowrk.

Electrical Line Requirements
Voltage Active Level, +5V +/−5%
Voltage Inactive Level, 0.5V +/−5%
Drive Current, 50mA 3. Dial Pulse Activation of this line operates the dial pulse relay in the coupler.

Electrical Line Requirements
Voltage Active Level, 5V +/−5% (Make)
Voltage Inactive Level, 0.5V +/+5% (Break)
Drive Current, 50mA 4. Off-Hook(OH)

Activated by the workstation modem hardware in order to energise the transfer relay, not shown, for transferring the telephone line from the handset to the modem.

Electrical Line Requirements
Voltage Active Level, 5V +/−5%
Voltage Inactive Level, 0.5V +/−5%
Drive Current, 120mA 5. Ring indicate(RI)

Activated by the coupler 4. When receiving ring pulse trains from the telephone exchange over the telephone line, the ring detector circuit validates them and lowers RI to the workstation modem hardware. The output signal is a rectified RI signal at double the RI frequency at TTL levels.

Electrical Line Requirements
High Voltage Level, 2.7 Vmin to 5 V, Output current, −400 µA max
Low Voltage Level, 0 V to 0.4 Vmax, Output current, 4 mA max 6. Switch Hook(SH)/Optional Activated by the coupler 4. When an attached handset is OFF HOOK, the line currant is detected and the switch hook circuit is activated and set low. The signal is high whenever the attached handset is in the ON HOOK position. The signal is presented to the modem at TTL levels.

Electrical Line Requirements
High Voltage Level, 2.7 Vmin to 5 V, Output current, −400 µA max
Low Voltage Level, 0 V to 0.4 max, Output current 4 mA max 7. Select Country Code TTL Logic Low selects the Least Significant ½ Byte of the country code and TTL Logic High selects the Most Significant ½ Byte of the country code - see Table 8 below.

Electrical Line Requirements
High Voltage Level, 2.7 Vmin to 5 V, Output current, −400 µA max
Low Voltage Level, 0 V to 0.4 Vmax, Output current, 4 mA max.

8. +5 Volt Line

A +5 V +/−5% power supply capable of supplying up to 300 mA to the coupler from the workstation modem hardware.

9, 10. Analogue 1 and 2

Provide the bidirectional data signals (TIP and RING) from/to the workstation modem hardware. Analogue data must comply with the relevant CCITT recommendation (ie V21, V22, V23, V22bis, V26bis, V26ter, V27ter, V32) whereapplicable. Meet a number of requirements concerning data transmission. The impedance, as seen by these two lines is 1200 ohms. 11-14.

Country Code

This provides a 255 country identification code to the workstation modem hardware. The code is made up of two ½ byte patterns which are selected by the Select Country Code signal.

Electrical Line Requirements
High Voltage Level, 2.7 Vmin to 5 V, Output current,
Low Voltage Level, 0 V to 0.4 Vmax, Output current, 15. Optional Line Electrical Line Requirements
High Voltage Level, 2.7 Vmin to 5 V, Output current, −400 µA max
Low Voltage Level, 0 V to 0.4 V max, Output current, 4 mA max The Country Identifier Code is hardwired into each coupler. The coupler is country unique by virtue of a unique country-specific plug and a set of components which meet the requirements of that country. The identifier code enables "identification" of that unique country by the ontrol logic. The code is contained in one byte allowing support for 255 different countries. The high or low order ½ byte are selected by the country select line. The workstation logic can read the code at initialisation or configuration time, and set up appropriate modulation techniques and other parameters specific to the supported network.

The following examples defines possible country codes for 14 countries. Extensions to this code can be easily accommodated.

A return of 1111 (Most significant ½ byte) and 1111 (least Significant ½ byte) may be used to indicate that the coupler is not attached.

TABLE 8.

| COUNTRY | LOW ½ Byte | HIGH ½ Byte |
|---|---|---|
| US | 1110 | 1111 |
| UK | 1101 | 1111 |
| AUSTRIA | 1100 | 1111 |
| BELGIUM | 1011 | 1111 |
| DENMARK | 1010 | 1111 |
| FRANCE | 1001 | 1111 |
| GERMANY | 1000 | 1111 |
| ISRAEL | 0111 | 1111 |
| ITALY | 0110 | 1111 |
| LUXEMBURG | 0101 | 1111 |
| NETHERLANDS | 0100 | 1111 |
| NORWAY | 0011 | 1111 |
| SWEDEN | 0010 | 1111 |
| SWITZERLAND | 0001 | 1111 |

Figure 4:
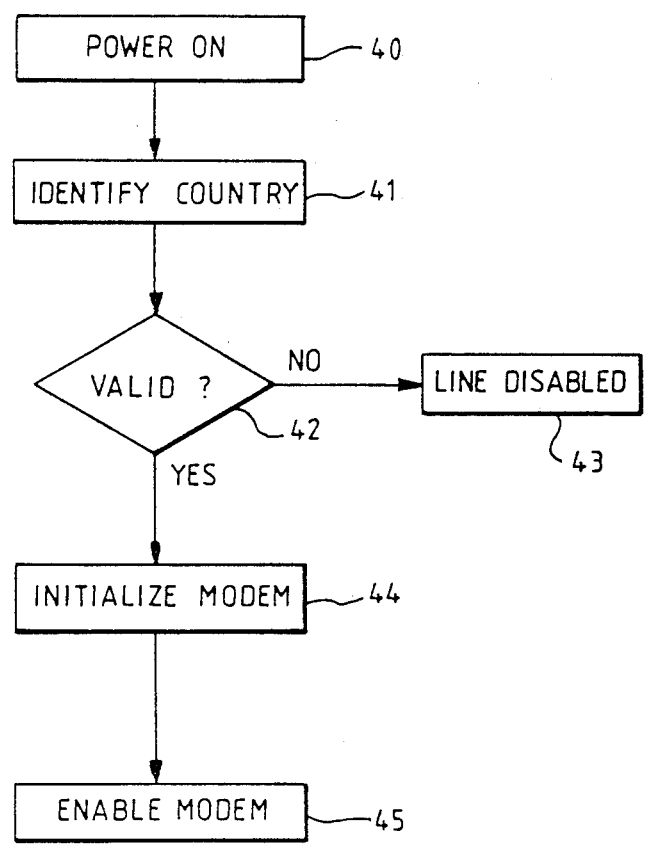
FIGS. 4 and 5 are flow charts which summarise the country set-up operation of the control logic from a ROS table and from a diskette file respectively.

FIG. 4 is a flow chart illustrating country set-up from the read only storage. The process is invoked each time the equipment is powered on as at step 40. At power on, the modem is reset to operate in a primitive command mode, that is the telephone line attach function is disabled. In step 41, the modem logic unit 25 reads the country identifier code from the coupler and validate this code by checking it against the country code stored within the modem. If the validity check, step 42, indicates non comparison, the modem reamins in the primitive mode, that is with the telephone line function disabled, as at step 43. If the validity check is valid, the modem is initialised as at step 44 by selecting the appropriate country parameter table to obtain the control code for correct operation of the modem. In a final step 45, the modem is enabled for full auto answer/call function. The process of FIG. 4 is used where the control code is contained in a read only store.

It will be apparent that the modem should only be enabled if the "correct" coupler is connected to it. It is crucial to this process that the "correct" country identifier and control code is stored within the equipment. As explained above, only authorised personnel should be able to modify or enter control code and country codes within the modem.

Figure 5:
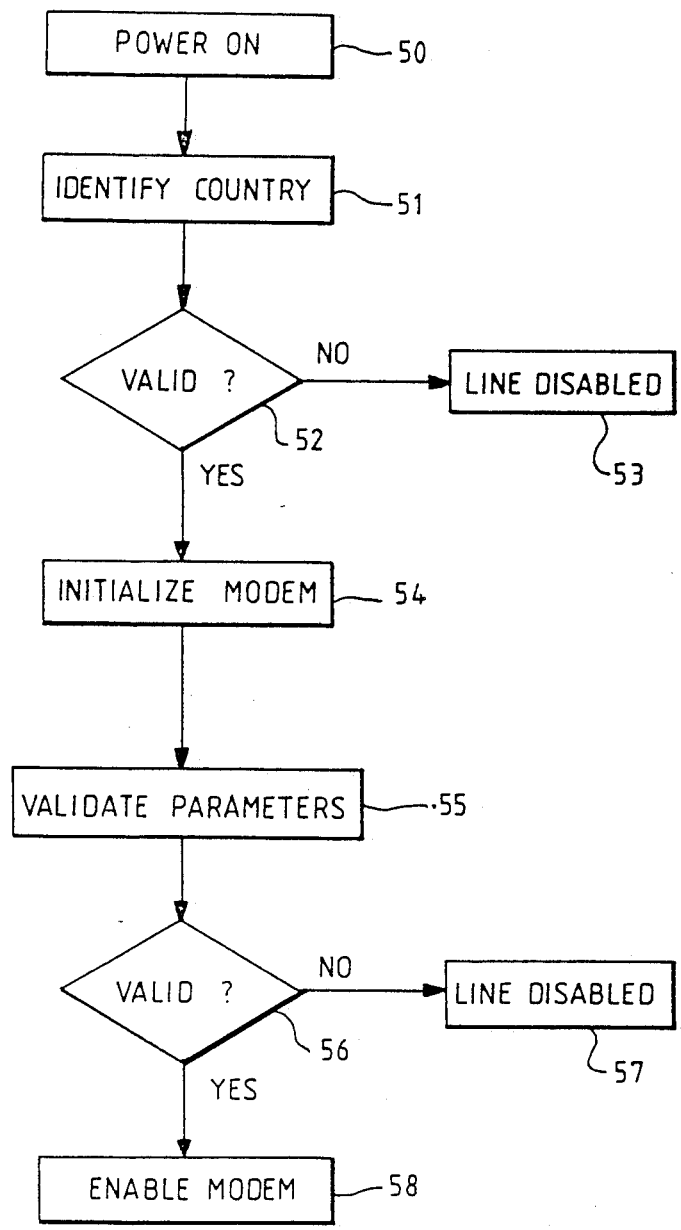

FIG. 5 is a flow chart illustrating how it can be ensured that when data processing equipment, such as a personal computer, incorporating a modem is set up from a diskette file, checks are made to determine that incorrect control code is not loaded into the modem. In step 50, the equipment is powered on, the modem is reset to primitive mode, that is with the telephone line attach function disabled. In step 51 the country is identified, either from a diskette loaded into the equipment or by operator, to run its PC loader utility from the PC operating system which reads and validates the coupler country identifier. If the result of the validity check 52 is invalidity, the modem is maintained in primitive mode as at 53 with the telephone line disabled. If the country identifier is valid, the modem is initialised at step 54. The PC loader utility selects an appropriate country parameter file from the PC disk (or diskette) and transfers it to the modem. In step 55, the modem logic ensures that the country parameters agree with a has check-sum contained in the parameter file. If as a result of this validity check 56 there is an error, the modem remains in primitive mode with the telephone line disabled, as at step 57: this prevents an operator from loading country parameters which do not correspond to the coupler attached to the equipment (and which is country unique). If the hash check 56 is valid, the modem is enabled as at step 58 to allow full auto answer/call function.

The invention has been described, by way of example, with reference to a telephone network. Clearly the invention is also applicable to digital networks, in which case there would be no need for modulation/demodulation circuits.

Where data processing equipment is to be connectable to either digital networks or analogue networks, it may be desirable to provide a digital output signal at the output of the apparatus and to incorporate any conversion circuits into the network coupler. Thus the couplers for telephone networks could include the digital to analogue and analogue to digital circuits, even if these are common to the whole range of telephone networks. Where the invention is being used to configure a modem, practical consideration would normally require the conversion circuits to be within the modem in close proximity to the DSP or the modulation/demodulation unit.

We claim:

1. Apparatus for connecting data processing equipment to a communication network, said apparatus including circuits for transmitting/or receiving signals between the data processing equipment and the communications network, and a digital processing means (23) for controlling the operation of said transmitting/receiving circuits in accordance with control code stored in a control store (24), and means (4) for coupling said apparatus to the network, characterised in that said apparatus includes common hardware for a range of different network standards, in that said coupling means contains an electrically readable identifier for identifying a particular comunication network which is to connected to said apparatus, and in that said apparatus is configured to the standard said particular network when said coupling means is connected to said apparatus.

2. Apparatus as claimed in claim 1, including control logic (25) adapted to read an identifier code indicative of a particular standard from said coupling means (4) and to enable said digital processing means to operate in accordance with control code associated with the identified standard.

3. Apparatus as claimed in claim 1 or claim 2 in which the control code contained in said store has a standard identifier associated therewith (27), operation of the apparatus only being enabled when the identifier (27) associated with the control code matches the identifier contained in the coupling means.

4. Apparatus as claimed in claim 1 or claim 2, in which means is provided for loading control code unique to a particular standard into said control store in accordance with the standard identified by the identifier contained within a particular coupler connected to the apparatus.

5. Apparatus as claimed in claim 3, in which means is provided for loading control code unique to a particular standard into said control store in accordance with the standard identified by the identifier contained within a particular coupler connected to the apparatus.

6. Apparatus as claimed in claim 4, in which the control code is loaded into the apparatus from a magnetic diskette in accordance with the standard identifier.

7. Apparatus as claimed in claim 1 or claim 2, in which the control store contains control code for a plurality of standards, said processing means being enabled to access only those sections of the control store containing control code to be used with the standard identified by the identifier.

8. Apparatus as claimed in claim 3, in which the control store contains control code for a plurality of standards, said processing means being enabled to access only those sections of the control store containing control code to be used with the standard identified by the identifier.

9. Apparatus as claimed in claim 2 for connecting data processing equipment to a telephone network, in the form of a modem provided with digital to analogue and analogue to digital converting circuits, which circuits are enabled only when a country identifier code read from the coupling means matches a country identifier stored with the modem.

10. Apparatus as claimed in claim 1, in which said coupling means further includes electrical components uniquely required for the equipment to meet the telephone standard associated with the attached plug.

11. Apparatus as claimed in claim 9, in which the standard identifier code is stored as a digital number.

* * * * *